United States Patent Office 2,928,832
Patented Mar. 15, 1960

2,928,832
HALOGENATED ARYLALKAMINE ETHERS

Howard B. Wright, Gurnee, and Marjorie B. Moore and Maynette R. Vernsten, Waukegan, Ill., assignors to Abbott Laboratories, North Chicago, Ill., a corporation of Illinois No Drawing. Application July 30, 1956
Serial No. 600,728

10 Claims. (Cl. 260—247.7)

This invention relates to a new class of ethers having highly useful physiological activity and more particularly to the aryl ethers of amino alkanols.

The ethers of this invention are characterized by the formula:

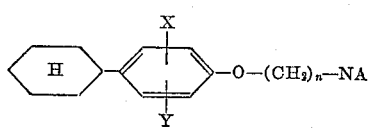

wherein $n$ is 2–5 inclusive, NA is an amino group which is attached to the alkylene group through the nitrogen and includes the dialkylamino, morpholinyl, piperidinyl, N'-carbethoxypiperazine and pyridinyl groups. X is halogen and Y is hydrogen, halogen or nitro.

The invention also embraces the non-toxic salts such as the acid addition salts of the above-identified ethers, e.g. the hydrochloride, the sulfate, the oxalate and the tartrate, and the quaternary ammonium salts, e.g. the methiodide and the ethylbromide salts of the ethers.

The compounds in this invention have been found to exhibit strong fungistatic activity against *Trichophyton mentagraphytes* and *Candida albicans* and in addition they exhibit other physiological activity such as local anesthesia.

The ethers of this invention are prepared by forming an alkali metal or an alkaline earth metal salt of a halogen substituted hydroxyaryl compound, and reacting the resulting salt with an alkamine halide to produce the aryl ether of the aminoalkanol.

The invention is illustrated in greater detail by the following examples but it should be understood that the examples are not intended to be a limitation on the scope of the invention.

EXAMPLE I
2-bromo-4-cyclohexylphenyl γ-4-morpholinylpropyl ether

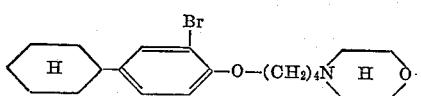

Twenty-five and four tenths grams (0.1 mole) of 2-bromo-4-cyclohexylphenol and 5.6 grams (0.1 mole) of potassium hydroxide are dissolved in 200 cc. absolute alcohol by refluxing. Then 16.3 grams (0.1 mole) of γ-4-morpholinylpropyl chloride is added and refluxing continued for 24 hours. After cooling and filtering, the filtrate is concentrated on a steam bath in vacuo. The residue is acidified and ether extracted to remove any unchanged starting materials. The aqueous layer is then made basic with 40% sodium hydroxide solution and extracted into ether. The ethereal solution is dried, concentrated and the product distilled. The boiling point is 205° C./0.65 mm. $n_D^{25}$ 1.5506. Analysis for $C_{19}H_{28}NBrO_2$.—Theory: C, 59.68; H, 7.38. Found: C, 59.88; H, 7.39.

EXAMPLE II
2-bromo-6-cyclohexylphenyl γ-4-morpholinylpropyl ether

Equimolar portions of 2-bromo-6-cyclohexylphenol and γ-4-morpholinylpropyl chloride are combined and the product is prepared according to the method of Example I. The boiling point is 223–224° C./3.6 mm. Analysis for $C_{19}H_{28}NBrO_2$.—Theory: C, 59.68: H, 7.38. Found: C, 59.55, H, 7.56.

EXAMPLE III
2-bromo-4-cyclohexylphenyl γ-4-carbethoxy-1-piperizinylpropyl ether hydrochloride Twenty-five and five tenths grams (0.1 mole) of 2-bromo-4-cyclohexylphenol and 4.6 grams of sodium are dissolved in 100 cc. of absolute alcohol by refluxing. Twenty-seven and one tenth grams (0.1 mole) of N-carbethoxy piperizinylpropyl chloride is then added and the mixture is refluxed for 17 hours. After cooling and filtering, the filtrate is concentrated on a steam bath in vacuo. The residue is acidified with hydrochloric acid and the solid hydrochloride salt of 2-bromo-4-cyclohexylphenyl γ-4-carbethoxy-1-piperizinylpropyl ether is recrystallized. The melting point is 213–214° C. Analysis for $C_{22}H_{33}N_2BrO_3 \cdot HCl$.—Theory: C, 53.94; H, 6.99. Found: C, 54.18; H, 7.21.

EXAMPLE IV
2,4-dibromo-6-cyclohexylphenyl γ-4-morpholinylpropyl ether hydrochloride The product is prepared by combining equimolar portions of 2,4-dibromo-6-cyclohexylphenol and γ-4-morpholinylpropyl chloride and separating the product as the hydrochloride salt according to the method of Example III. The melting point is 195–200° C. Analysis for $C_{19}H_{27}NBr_2O_2 \cdot HCl$.—Theory: C, 45.85; H, 5.67. Found: C, 44.35; H, 5.58.

EXAMPLE V
2,6-dibromo-4-cyclohexylphenyl γ-4-morpholinylpropyl ether hydrochloride The product is prepared by combining equimolar portions of 2,6-dibromo-4-cyclohexylphenol and γ-4-morpholinylpropyl chloride and separating the product as the hydrochloride salt according to the method of Example III. Analysis for $C_{19}H_{27}NBr_2O_2 \cdot HCl$.—Theory: C, 45.85; H, 5.67. Found: C, 46.50; H, 5.70.

EXAMPLE VI
2-bromo-4-cyclohexylphenyl γ-diethylaminopropyl ether

The product is prepared by combining equimolar portions of 2-bromo-4-cyclohexylphenol and γ-diethylaminopropyl chloride according to the method of Example I. The boiling point is 203–204° C./2.3 mm. Analysis for $C_{19}H_{30}NBrO$.—Theory: C, 61.95; H, 8.21. Found: C, 61.71; H, 8.02.

EXAMPLE VII
4-bromo-2-cyclohexylphenyl γ-4-morpholinylpropyl ether

The product is prepared by combining equimolar portions of 4-bromo-2-cyclohexylphenol and γ-4-morpholinylpropyl chloride according to the method of Example I. The boiling point is 213° C./2.5 mm.

EXAMPLE VIII
2-nitro-4-chloro-6-cyclohexylphenyl γ-4-morpholinylpropyl ether hydrochloride The product is prepared by combining equimolar portions of 2-nitro-4-chloro-6-cyclohexylphenol and γ-4-morpholinylpropyl chloride and separating the product as the hydrochloride salt according to the method of Example III. The melting point is 202–203° C. Analysis for $C_{19}H_{27}ClN_2O_4 \cdot HCl$.—Theory: C, 54.43; H, 6.73. Found: C, 54.36; H, 6.88.

EXAMPLE IX

*2-chloro-6-cyclohexylphenyl γ-4-morpholinylpropyl ether hydrochloride*

The product is prepared by combining equimolar portions of 2-chloro-6-cyclohexylphenol and γ-4-morpholinylpropyl chloride and separating the product as the hydrochloride salt according to the method of Example III. The melting point is 203–204° C. Analysis for $C_{19}H_{28}ClNO_2 \cdot HCl$.—Theory: C, 60.96; H, 7.81. Found: C, 59.80; H, 7.95.

EXAMPLE X

*2-bromo-4-cyclohexylphenyl γ-1-piperidylpropyl ether*

Twenty-four and five tenths grams (0.074 mole) of 2-bromo-4-cyclohexylphenoxy propyl chloride is refluxed in 100 cc. dry toluene for three hours after adding 6.3 grams (0.074 mole) piperidine. An additional 6.3 grams of piperidine is added and refluxed for 9.5 hours. The solution is cooled, filtered and concentrated. The boiling point is 220–222° C./2.4 mm. Analysis for $C_{20}H_{30}NBrO$.—Theory: C, 63.15; H, 7.95. Found: C, 62.20; H, 7.65.

EXAMPLE XI

*2-bromo-4-cyclohexylphenyl δ-4-morpholinylbutyl ether*

The product is prepared according to the method of Example X. The boiling point is 232–233° C./2.1 mm. Analysis for $C_{20}H_{30}NBrO_3$.—Theory: C, 60.60; H, 7.81. Found: C, 61.13; H, 7.74.

EXAMPLE XII

*2-bromo-4-cyclohexylphenyl ε-4-morpholinylamyl ether*

The product is prepared according to the method of Example X. The boiling point is 238–240° C./2.0 mm. Analysis for $C_{21}H_{32}NBrO_2$.—Theory: C, 61.46; H, 7.86. Found: C, 61.53; H, 7.69.

EXAMPLE XIII

*2-bromo-4-cyclohexylphenyl β-4-morpholinylethyl ether*

The product is prepared according to the method of Example X. The boiling point is 215° C./2.1 mm. Analysis for $C_{18}H_{26}NBrO_2$.—Theory: C, 58.70; H, 7.11. Found: C, 58.71; H, 6.80.

This application is a continuation-in-part of the co-pending application under the same title and by the same inventors, filed April 21, 1954, Serial No. 424,741, now abandoned.

Others may practice this invention in any of the numerous ways which will be suggested to one skilled in the art and all such practice is intended to be covered by this invention, provided, however, that it falls within the scope of the appended claims.

We claim:

1. A chemical compound selected from the group consisting of basic ethers and the non-toxic, acid-addition salts thereof, said ethers having the following formula:

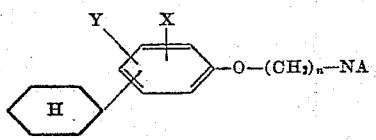

wherein n is 2–5 inclusive, NA is selected from the class consisting of diloweralkylamino, morpholinyl, piperidinyl and N'-carbethoxypiperazinyl, X is halogen selected from the group consisting of chloro and bromo, and Y is selected from the group consisting of hydrogen, halogen and nitro.

2. A chemical compound having the following formula:

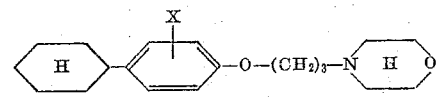

wherein X is bromine selected from the group consisting of chloro and bromo.

3. 2-bromo-4-cyclohexylphenyl γ-4-morpholinylpropyl ether.

4. 2,4-dibromo-6-cyclohexylphenyl γ-4-morpholinylpropyl ether hydrochloride.

5. 2-bromo-4-cyclohexylphenyl γ-4-carbethoxy-1-piperazinylpropyl ether hydrochloride.

6. 2-nitro-4-chloro-6-cyclohexylphenyl γ-4-morpholinylpropyl ether hydrochloride.

7. 2-bromo-4-cyclohexylphenyl γ-1-piperidylpropyl ether.

8. A non-toxic, acid-addition salt of a chemical compound having the following formula:

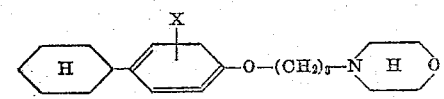

wherein X is bromine.

9. A chemical compound having the following formula

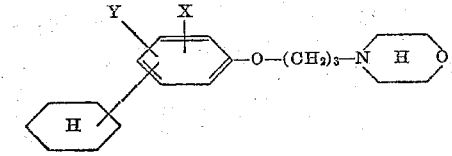

wherein X is halogen and Y is chlorine.

10. A non-toxic, acid-addition salt of a chemical compound having the following formula

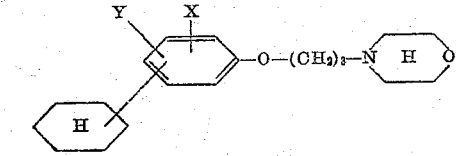

wherein X is halogen and Y is chlorine.

References Cited in the file of this patent

UNITED STATES PATENTS

| | | |
|---|---|---|
| 2,679,501 | Wenner | May 25, 1954 |
| 2,838,510 | Suter et al. | June 10, 1958 |
| 2,851,460 | Bryant et al. | Sept. 9, 1958 |

FOREIGN PATENTS

| | | |
|---|---|---|
| 1,056,793 | France | Oct. 28, 1953 |

OTHER REFERENCES

Burger et al.: J.A.C.S., vol. 67 (1945), pp. 1416–1418.